US006753784B1

(12) United States Patent
Sznaider et al.

(10) Patent No.: US 6,753,784 B1
(45) Date of Patent: Jun. 22, 2004

(54) GIS-BASED AUTOMATED WEATHER ALERT NOTIFICATION SYSTEM

(75) Inventors: Ronald J. Sznaider, River Falls, WI (US); Douglas P. Chenevert, Lakeville, MN (US); Robert L. Hugg, Eagan, MN (US); Clive F. Reece, St. Paul, MN (US); James H. Block, Minneapolis, MN (US)

(73) Assignee: Meteorlogix, LLC, Burnsville, MN (US)

( * ) Notice: Subject to any disclaimer, the term of this patent is extended or adjusted under 35 U.S.C. 154(b) by 0 days.

(21) Appl. No.: 09/819,349

(22) Filed: Mar. 28, 2001

(51) Int. Cl.[7] .................................................. G01W 1/00

(52) U.S. Cl. ............... 340/601; 340/286.02; 340/539.1; 340/539.28

(58) Field of Search ............................ 340/286.02, 539, 340/601, 539.1, 539.28; 342/26, 104

(56) References Cited

U.S. PATENT DOCUMENTS

| | | | | |
|---|---|---|---|---|
| 4,277,845 | A | 7/1981 | Smith et al. | 455/52 |
| 4,347,618 | A | 8/1982 | Kavouras et al. | 375/37 |
| 4,402,672 | A | 9/1983 | Lowe, Jr. | 434/217 |
| 4,422,037 | A | 12/1983 | Coleman | 324/72 |
| 4,506,211 | A | 3/1985 | Coleman | 324/72 |
| 4,521,857 | A | 6/1985 | Reynolds, III | 364/439 |
| 4,649,388 | A | 3/1987 | Atlas | 342/26 |
| 4,712,108 | A | 12/1987 | Schwab | 342/26 |
| 4,916,539 | A | 4/1990 | Galumbeck | 358/142 |
| 5,111,400 | A | 5/1992 | Yoder | 364/424.01 |
| 5,117,359 | A | 5/1992 | Eccles | 364/420 |
| 5,175,551 | A | 12/1992 | Rubin | 342/26 |
| 5,208,587 | A | 5/1993 | Cornman | 340/968 |
| 5,255,190 | A | 10/1993 | Sznaider | 364/420 |
| 5,315,297 | A | 5/1994 | Cornman | 340/968 |
| 5,351,045 | A | 9/1994 | Cornman | 340/968 |
| 5,359,330 | A | 10/1994 | Rubin et al. | 342/26 |
| 5,379,215 | A | 1/1995 | Kruhoeffer et al. | 364/420 |
| 5,381,338 | A | 1/1995 | Wysocki et al. | 364/449 |
| 5,406,481 | A | 4/1995 | Shinozawa et al. | 364/420 |
| 5,432,895 | A | 7/1995 | Myers | 395/119 |
| 5,490,239 | A | 2/1996 | Myers | 395/129 |
| 5,491,629 | A | 2/1996 | Fox et al. | 364/420 |
| 5,517,193 | A | 5/1996 | Allison et al. | 342/26 |

(List continued on next page.)

OTHER PUBLICATIONS

TITAN: Thunderstorm Identification, Tracking, Analysis, and Nowcasting–A Radar–based Methodology *Journal of Atmospheric and Oceanic Technology* vol. 10, No. 6 Dec. 1993 Michael Dixon and Gerry Wiener.

Some Wind and Instability Parameters Associated With Strong and Violent Tornadoes 1. Wind Shear and Helicity *The Tornado: Its Structure, Dynamics, Prediction, and Hazards Geophysical Monograph 79* Jonathan M. Davies and Robert H. Johns.

Nexrad Doppler Radar Symposium/Workshop *University of Oklahoma–NOAA Sep. 22–24, 1982 at Norman Public Library and The National Severe Storms Laboratory.*

(List continued on next page.)

*Primary Examiner*—Julie Lieu
(74) *Attorney, Agent, or Firm*—Thomas J. Nikolai; Nikolai & Mersereau, P.A.

(57) ABSTRACT

An automated weather alert system using GIS technology automatically ingests weather data and processes the weather data to determine if localized weather conditions pose a threat to any of a plurality of business operations, each of which have a known location. In the event such threat exists, an employee having responsibility for a threatened business operation is provided with an alert message and asked to acknowledge receipt. Additional notification is automatically provided to the employee's supervisor if such acknowledgment is not received within a predetermined period of time.

53 Claims, 12 Drawing Sheets

U.S. PATENT DOCUMENTS

| | | | | | |
|---|---|---|---|---|---|
| 5,521,813 | A | | 5/1996 | Fox et al. | 364/401 |
| 5,583,972 | A | | 12/1996 | Miller | 395/119 |
| 5,596,332 | A | | 1/1997 | Coles et al. | 342/455 |
| 5,654,886 | A | | 8/1997 | Zereski, Jr. et al. | 364/420 |
| 5,706,846 | A | | 1/1998 | Sutton | 135/128 |
| 5,717,589 | A | | 2/1998 | Thompson et al. | 364/420 |
| 5,732,510 | A | | 3/1998 | Sutton et al. | 52/1 |
| 5,796,932 | A | | 8/1998 | Fox et al. | 395/161 |
| 5,832,456 | A | | 11/1998 | Fox et al. | 705/10 |
| 5,839,089 | A | | 11/1998 | Yasuda et al. | 702/3 |
| 5,904,296 | A | | 5/1999 | Doherty et al. | 239/61 |
| 5,910,763 | A | * | 6/1999 | Flanagan | 340/286.02 |
| 5,940,776 | A | | 8/1999 | Baron et al. | 702/4 |
| 5,978,715 | A | | 11/1999 | Briffe et al. | 701/11 |
| 6,018,699 | A | | 1/2000 | Baron, Sr. et al. | 702/3 |
| 6,052,648 | A | | 4/2000 | Burfeind et al. | 702/3 |
| 6,112,075 | A | | 8/2000 | Weiser | 455/404 |
| 6,125,328 | A | | 9/2000 | Baron et al. | 702/3 |
| 6,154,699 | A | | 11/2000 | Williams | 701/50 |
| 6,163,756 | A | | 12/2000 | Baron et al. | 702/3 |
| 6,169,476 | B1 | | 1/2001 | Flanagan | 340/286.02 |
| 6,173,904 | B1 | | 1/2001 | Doherty et al. | 239/1 |
| 6,188,960 | B1 | | 2/2001 | Baron et al. | 702/3 |
| 6,199,000 | B1 | | 3/2001 | Keller et al. | 701/50 |
| 6,252,539 | B1 | * | 6/2001 | Phillips et al. | 342/26 |

OTHER PUBLICATIONS

Automatic Cell Detection and Tracking *IEEE Transactions on GeoScience Electronics Oct. 1979* vol. GE–17 No. 4 Robert K. Crane.

Automatic Identification and Tracking of Radar Echoes in Hiplex *18th Conference on Radar Meterology of the American Meteorological Society Mar. 28–31, 1978 Atlanta, Georgia* Patrick J. Brady, et al.

Next Generation Weather Radar (NEXRAD) Product Description Document Dec. 1986.

Objective Method for Analysis and Tracking of Convective Cells as Seen by Radar *Journal of Atmospheric and Oceanic Technology Sep. 1987* vol. 4, No. 3 Daniel Rosenfeld.

The Nexrad System—Concepts and Capabilities Basic Nexrad Products *Nexrad Applications and the Media A Short Course Held in Conjunction with the 20th Annual Conference on Broadcast Meteorology Jun. 20, 1990 Boulder, Colorado.*

The WSR–88D and the WSR–88D Operational Support Facility *Bulletin of the American Meteorological Society* vol. 74, No. 9 Sep. 1993 Timothy D. Crum and Ron L. Alberty.

A Description of the Initial Set of Analysis Products Available from the NEXRAD WSR–88D System *Bulletin of the American Meteorological Society* vol. 74, No. 7 Jul. 1993 Gerard E. Klazura and David A. Imy.

Processing and Analysis Techniques Used With the NSSL Weather Radar System *14th Radar Meteorology Conference Nov. 17–20, 1970 Tucson, Arizona* Kenneth E. Wilk and Kathryn C. Gray.

Real–Time Forecasting of Echo–Centroid Motion *The University of Oklahoma Graduate College—A Thesis Submitted to the Graduate Faculty in partial fulfillment of the requirements for the degree of Master of Science in Meteorology* Norman, Oklahoma 1979 Douglas Edward Forsyth.

An Automated Real–Time Storm Analysis and Storm Tracking Program (WEATRK) *Air Force Geophysics Laboratory Environmental Research Papers*, No. 715 Oct. 1, 1980 Carlton J. Bjerkaas, Capt, USAF and Douglas E. Forsyth, Capt, USAF.

* cited by examiner

NOTE: ARROWS INDICATE INITIATION OF COMMUNICATION, NOT NECISSARILY THE DIRECTION OF PRIMARY DATA FLOW.

GIS-BASED AUTOMATED WEATHER ALERT NOTIFICATION SYSTEM

BACKGROUND OF THE INVENTION

I. Field of the Invention

The present invention provides a system that automatically processes weather data and delivers timely warnings of adverse weather conditions. More specifically, the present invention provides a system that automatically generates advanced warning of weather conditions likely to affect operations of a business such as a railroad, trucking company, construction company, or the like so that appropriate personnel can take steps necessary to mitigate the risks to life and equipment associated with adverse weather conditions.

II. Background of the Invention

Railroads, trucking companies, construction companies, recreational organizations and the like all have their operations impacted by the weather. For example, the rail systems of today are extremely safe. However, like all modes of transportation, rail operations can be adversely affected by weather conditions. Weather is the most common cause of derailment of railroad cars when such derailments occur. Derailment can result in injury or death to workers and passengers. Derailment can also cause substantial damage to railroad track, cars and cargo. A single derailment can cause losses that can exceed a million dollars.

The chances of derailment can be reduced substantially if trains can be diverted from areas affected by adverse weather conditions. Even when it is not possible to divert the train, the threat of damage and death can be reduced if rail traffic is halted before it encounters adverse weather conditions. Studies suggest that, even if the weather conditions cannot be avoided, a weather related accident involving a moving train can be ten times more costly than one involving a stationary train. The momentum of a moving train during a derailment increases the level of destruction to rail cars, track and life ten-fold.

Various weather events can affect rail operations. These fall into three main categories—high winds, flooding of the track, and temperature extremes that can expand or contract the rails of the track causing them to break, warp, or otherwise move out of proper alignment.

Thus, an effective weather alert system must provide advanced warning of wind, flooding and temperature conditions that could pose a threat to moving trains. The vast geographic territory over which railroads operate their trains and the localized nature of weather phenomena present unique challenges. The Union Pacific Railroad, for example, manages 38,654 miles of track in 23 states. It links all major West Coast and Gulf ports. It provides four major gateways to the east. It is the primary rail connection between the United States and Mexico. It also interchanges rail traffic with the rail system in Canada. The Union Pacific Railroad operates 6,847 locomotives. These locomotives must be run as efficiently as possible to hold freight costs down for customers and provide the Union Pacific with a reasonable return on the substantial investment it has made. Whenever it is safe to do so, the trains must be kept moving.

If one considers the vast landscape over which the Union Pacific operates, one soon realizes that only a very small portion of the rail system will be impacted by localized weather phenomena, such as wind gusts, tornadic activity or flash flooding. Operation over the remainder of the rail system can continue without undo risk. Even those areas of the system that are subjected to such adverse weather conditions may only be affected by such conditions for very short periods of time. This is certainly true for severe thunderstorms and tornados. They present a very real threat, but only in a localized area and only briefly.

Given the vast area covered by railroad tracks and the localized nature of weather conditions, a rail traffic control system could quickly be overwhelmed by localized weather reports covering each area of the system. Such information overload can be a curse as well as a blessing. If the information is not effectively sorted and prioritized, important information might not be acted on in a timely manner. Also, dispatchers inundated with alerts and warnings might become desensitized to the potential danger and not act in a appropriate manner to save life and property.

Businesses, other than railroads, can also be affected by adverse whether conditions. Many trucking companies deploy their fleet of trucks over a wide geographic area. Sometimes this area covers the entire nation. Severe weather conditions can hamper trucking operations in many of the same ways as rail operations and with the same risk to life and property. As trucks travel the highways and roads of this country, they can encounter wind conditions, precipitation including hail, sleet and severe thunderstorms, and temperature extremes that pose a significant threat. Even when roads are inundated with snow in certain areas of the country, they are clear in other areas of the country. Likewise, tornadic and wind gust activity can present a significant danger, but generally only in a very localized area and for a relatively short period of time. While truckers should avoid these areas during times of danger, it is safe to operate elsewhere and during times when no danger is present.

Weather presents similar challenges to construction companies. Personnel, equipment and materials can be safeguarded from hazardous weather conditions if sufficient advanced warning is provided. Construction companies can be involved in a single project at a single site. More often, however, they are involved in multiple projects at widely dispersed locations. Again, advanced warning of weather conditions likely to impact a specific construction site, as opposed to a general advisory, can be of significant advantage to a construction company.

The need for site specific notifications of impending adverse weather conditions is not limited to railroads, trucking companies or construction companies.

In fact, such information can be of great value to many other businesses. Some of these include amusement parks, golf courses, ski resorts, marinas, race tracks, agricultural cooperatives and schools. In each instance, a system which provides site specific weather alerts could permit the protection of life and property without undue disruption of the enterprise when the weather conditions at the site impose no real threat.

SUMMARY OF THE INVENTION

With the foregoing challenges in mind, it should be clear that there is a real need for a weather alert system that can effectively meet each of such challenges. Therefore, the object of the present invention is to provide a weather alert system for businesses that collects and processes weather information and issues clear, timely and effective location specific warnings to the business.

Another object of the present invention is to provide such a system that is highly automated. Still another object of the invention is to provide a highly effective weather enabled decision support mechanism based upon Geographical Information System (GIS) technology.

Another object of the present invention is to provide such a system which intelligently formats and routes messages related to weather conditions.

Another object of the invention is to provide such a system which, when appropriate, requires timely and positive acknowledgment that messages have been received.

A further object of the invention is to provide an archive of messaging activity for historical analysis.

A further object of the present invention is to provide such warnings on a site-specific basis so only sites to be impacted by adverse weather conditions receive such warning.

Another object of the present invention is to provide a weather alert system that automatically collects weather information related to the entire geographic area in which the business operates.

Another object of the present invention is to provide a weather alert system capable of automatically processing the weather information to predict adverse weather conditions that might impact business operations anywhere the business operates.

Still another object of the present invention is to provide a weather alert system capable of automatically generating weather advisories in a timely fashion to businesses so that the business can take the steps necessary to avoid catastrophic loss of life and property.

Still another object of the invention is to ensure receipt by appropriate personnel of significant weather advisories.

To meet the objectives outlined above, a weather alert system is provided which includes a file server and a plurality of remote workstations. The remote workstations can be in the form of a personal computer, cell phone, two-way pager, or other device capable of communication with the file server.

The file server typically will have Geographical Information System (GIS) software loaded on it as well as messaging software. The location of individual business assets are electronically mapped using the GIS software.

The file server collects weather information from the National Weather Service (NWS) and other sources. One important type of data distributed by the NWS is nationwide NEXRAD radar data. This data is generated by the WSR-88D network of Doppler radars installed throughout the country and operated by the NWS. Such data is collected and disseminated by weather data providers such as DTN Weather Services, Burnsville, Minnesota. Another important source of data are NWS watches and warnings. The NWS also distributes weather forecast grids and current observation data that can be ingested and used by the file server. Data from sources other than the NWS, such as custom weather forecasts, can also be ingested and used by the file server.

In the present invention, all such data is automatically ingested into the file server for processing. The file server automatically disregards data that is not material to the operation of the business. To perform this task, the file server compares the weather data received to various programmable parameters. These parameters generally relate to the location of a company's business operations and the types of weather conditions that could adversely impact business operations. Any data that suggests that conditions may exist that could adversely impact operations are further processed. For example, if tornadic activity is detected, the location, direction of movement and speed of the tornado is automatically assessed to determine whether the tornado poses a threat to any location operated by the business. If so, the business locations likely to be affected by the tornado are identified and the arrival time of the tornado at each identified business location is determined. The messaging software of the file server automatically notifies the person responsible for managing the specific business location. If that person fails to acknowledge receipt of the notification within a predetermined time period, the system automatically transmits a second message that is sent to that person's supervisor.

The file server can perform other functions as well. For example, the data can also be organized and archived for future analysis of the efficacy of the manager's or supervisor's response.

While the foregoing example is with reference to tornadic activity, the same system can provide the same type of warning of other wind dangers, flooding dangers, precipitation dangers or temperature extremes that can adversely impact the operation of the business. The present invention can be better understood by reading the following detailed description of the invention in view of the accompanying drawings.

DETAILED DESCRIPTION OF THE PREFERRED EMBODIMENTS

Figure 1:
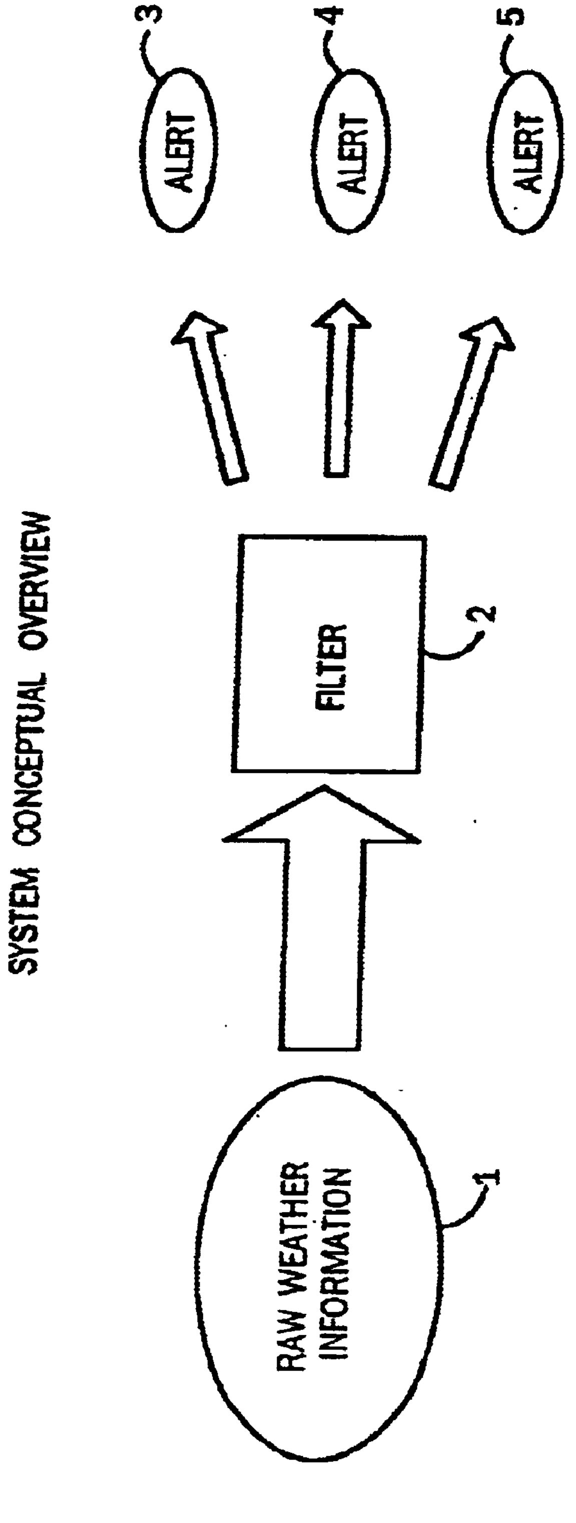
FIG. 1 is a flow chart showing a conceptual overview of the present invention.

The present invention is intended for use by a variety of businesses. The broad concept of the invention is shown in FIG. 1. As shown, a large quantity of raw weather information 1 is gathered. This weather information is input into a computer system which serves as a filter 2 and generates a plurality of alerts 3, 4 and 5 based upon the parameters used by the computer system to filter the raw weather information 1.

Figure 2:
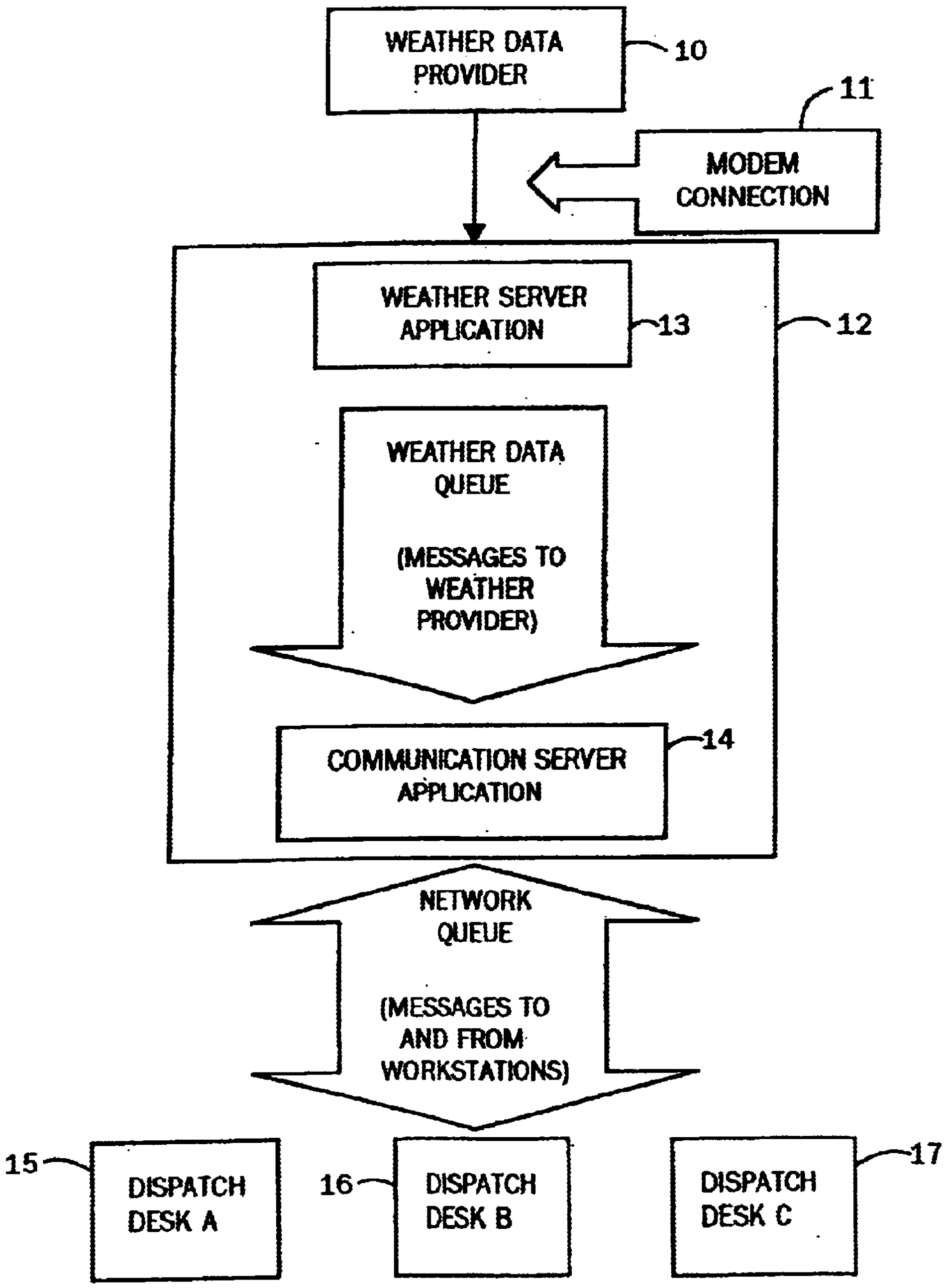
FIG. 2 is a flow chart showing how messages are distributed based upon weather data received.

As shown in FIG. 2, the information used by the present invention will typically come from a weather data provider 10. The weather data provider 10 could be the National Weather Service (NWS) or, preferably, one of the firms that have contracted with the NWS to disseminate weather data. While only one weather service provider 10 is shown in FIG. 2, there is no reason why the system could not receive weather data from more than one provider or other sources, such as private networks.

In FIG. 2, the data from the weather data provider is transferred via a modem 11 or other communications link to a file server 12. The file server 12 runs a plurality of software applications. These are shown as weather server application 13 and communication server application 14 in FIG. 2. The weather server application 13 processes the weather data from the weather data provider 10 based upon a pre-existing set of instructions to determine if the system should generate and distribute alert messages. Specifically, the weather server application 13 converts the weather data from various sources into GIS compatible formats and then uses the data to generate and distribute alert messages. If messages are to be distributed, these messages are forwarded to the communication server application 14 which handles distribution. Specifically, the communication server application 14 directs the messages to the workstation located on the correct dispatch desk (15, 16 or 17). While three dispatch desks (15, 16 and 17) are shown in FIG. 2, the system is capable of routing messages to a hundred or more of such workstations. The Network Queue arrow in FIG. 2 show two-way communication between the workstations on desks 15, 16 and 17 and the communication server application 14. Two-way communication is provided so the file server 12 can (1) receive confirmation messages sent to the workstations; and (2) send additional notification messages if such confirmation is not received by the file server 12.

Figure 3:
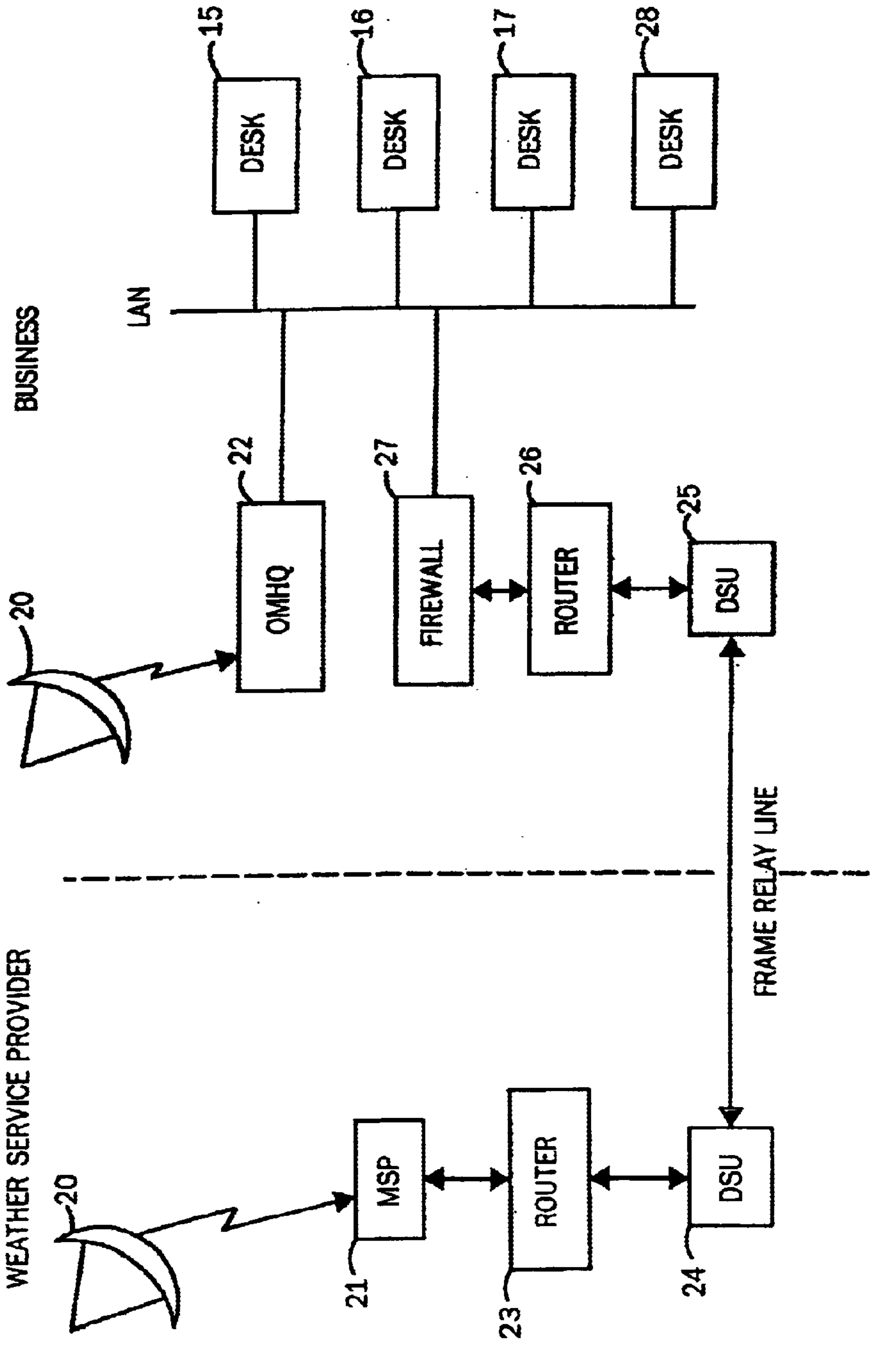
FIG. 3 is a block diagram of the hardware used to practice the present invention.

FIG. 3 shows the hardware required for one implementation of the present invention. Weather data is received, via satellite, by two separate file servers 21 and 22. Having two file servers 21 and 22 provides redundance. Also, physically separating the file servers 21 and 22 limits problems associated with disruption of electrical service or the like. In the example shown, file server 21 is located in the Twin Cities of Minneapolis and St. Paul, Minnesota (MSP) at the office of a weather information provider. File server 22 is located in Omaha, Nebraska at the headquarters of a business and is designated OMHQ. Also located at the office of the weather service provider are a router 23 and a data service unit (DSU) 24. A DSU 25 is provided at the business headquarters. A frame relay line connects DSU 24 to DSU 25 to provide a high-speed communications link between the weather service provider and the business. Such communications could, alternatively, be by satellite or any other reliable means.

In addition to the file server 22 and the DSU 25, the business will also typically have a router 26 and firewall 27 at its headquarters. Desks 15, 16 and 17 (on which the workstations are placed) may be located at the headquarters or at a remote location. In FIG. 3, a fourth desk 28 is shown and distanced from the other desks to signify that the desks can be at locations remote from each other. In either event, the file server 22 and the desks 15, 16, 17 and 18 are all interconnected as part of a local area or wide area network (LAN/WAN).

For the system shown in FIG. 3 to operate, each of the file servers 21 and 22 and workstations located on desks 15–17 and 28 must be loaded with certain software components. In the embodiment described, server 21 is loaded with an operating system, preferably Windows NT Server published by Microsoft Corporation of Redmond, Washington, Geographical Information System (GIS) such as ArcView published by Environmental Systems Research Institute (ESRI) of Redlands, California; SQL Server published by Microsoft Corporation; Internet Explorer 5 published by Microsoft Corporation, and the MSMQ (Microsoft Message Queuing) primary site controller software licensed with Windows NT Server by Microsoft. Also loaded on the file server 21 are several other software modules developed specifically for implementation as part of the present invention. These are referred to as Alert Manager, Alert Distribution, Alert Archive, Archive Alert Review. These modules are discussed in greater detail below.

The software to be installed on server 22 can include all of the software discussed above with respect to server 21. However, the only necessary software is Windows NT Server, SQL Server and the MSMQ Primary Enterprise Controller Module licensed with Windows NT.

The workstations on the desks 15–17 and 28 will all be loaded with certain software as well. Windows NT Workstation, Internet Explorer and MSMQ Independent Client, all of which are available from Microsoft Corporation, are loaded on each workstation. Also, two modules specifically developed for implementation as part of this invention, and described in further detail below, should be loaded on each workstation. These are referred to as Alert Receiver and Active Alert Review.

As indicated above, the file server 21 is loaded with four software modules specifically developed as part of this invention. Similarly, the workstations are all loaded with two specially developed software modules.

The function of these modules will be discussed now. The Alert Manager software module loaded on the file server 21 is, in essence, the filter 2 (FIG. 1) for the notification system of the present invention. The Alert Manager module responds to incoming weather information, applies rules to determine whether the weather conditions meet the thresholds for being significant to business operations, and determines whether the location of the weather condition coincides with any of the business's operations. If so, the Alert Manager triggers a notification message. The Alert Manager is implemented as a set of scripts which run within the execution environment of the GIS software. To make a connection to the Alert Distribution software module, the Alert Manager makes calls to DLL (dynamic link library) resident wrapper functions to construct an XML (extensible markup language) text message and to send the message to Alert Distribution via the MSMQ Primary Enterprise Control module.

The Alert Distribution module, also loaded on file server 21, accepts notification messages from the Alert Manager and passes them along, via MSMQ. It also monitors acknowledgments of message receipts from the workstations. If no acknowledgment to a notification message is received within a predetermined time period (which is adjustable), the Alert Distribution module escalates the notification sending it, for example, to supervisory personnel. All notifications, acknowledgments, and failures to acknowledge are logged using the journals feature of MSMQ.

Periodically, the logged messages in the MSMQ journals must be archived to disk files and deleted from the journals. This function is accomplished using the Alert Archive software module loaded on file server 21. Maintenance of such disk files allows review of the historical alert message activity. These files can be saved on removable storage media if necessary. If desired, the Alert Archive module can also be used to generate an archive image without deleting the message from the MSMQ journal. Having historical data of this type preserved by the Alert Archive module can be particularly beneficial in evaluating the efficacy of the system, the appropriateness of the programmed thresholds for issuing an alert message, and the manner in which employees responded to weather alert messages generated by the system. The Alert Archive Review module loaded on file server 21 works hand-in-hand with the Alert Archive module. The Archive Alert Review allows a user to review archive messages that have been saved to a disk by Alert Archive. The Alert Archive Review implements this as an XML style sheet.

As indicated above, software modules developed as part of the present invention are loaded on each of the workstations 15–17, 28. The Alert Receiver module is presented on the workstation whenever a notification message arrives at the dispatcher's desk 15–17, 28. Along with the notification message, a dialog screen appears for the dispatcher's use in acknowledging receipt of the message containing the weather alert. The Alert Receiver component is also used for notification messages to supervisors in the event the employee who originally received the message does not acknowledge receipt within the predetermined time period. Messages sent to supervisors would typically include both the original alert message and a non-acknowledgment notification message. See FIG. 12. The Active Alert Review takes over after the initial notification dialog is closed. Active Alert Review allows the user to view the currently active messages that have been saved locally. More specifically, the Active Alert Review permits the user to review previously received, active messages to re-examine the weather problem. This module is implemented as an XML style sheet.

Figure 4:
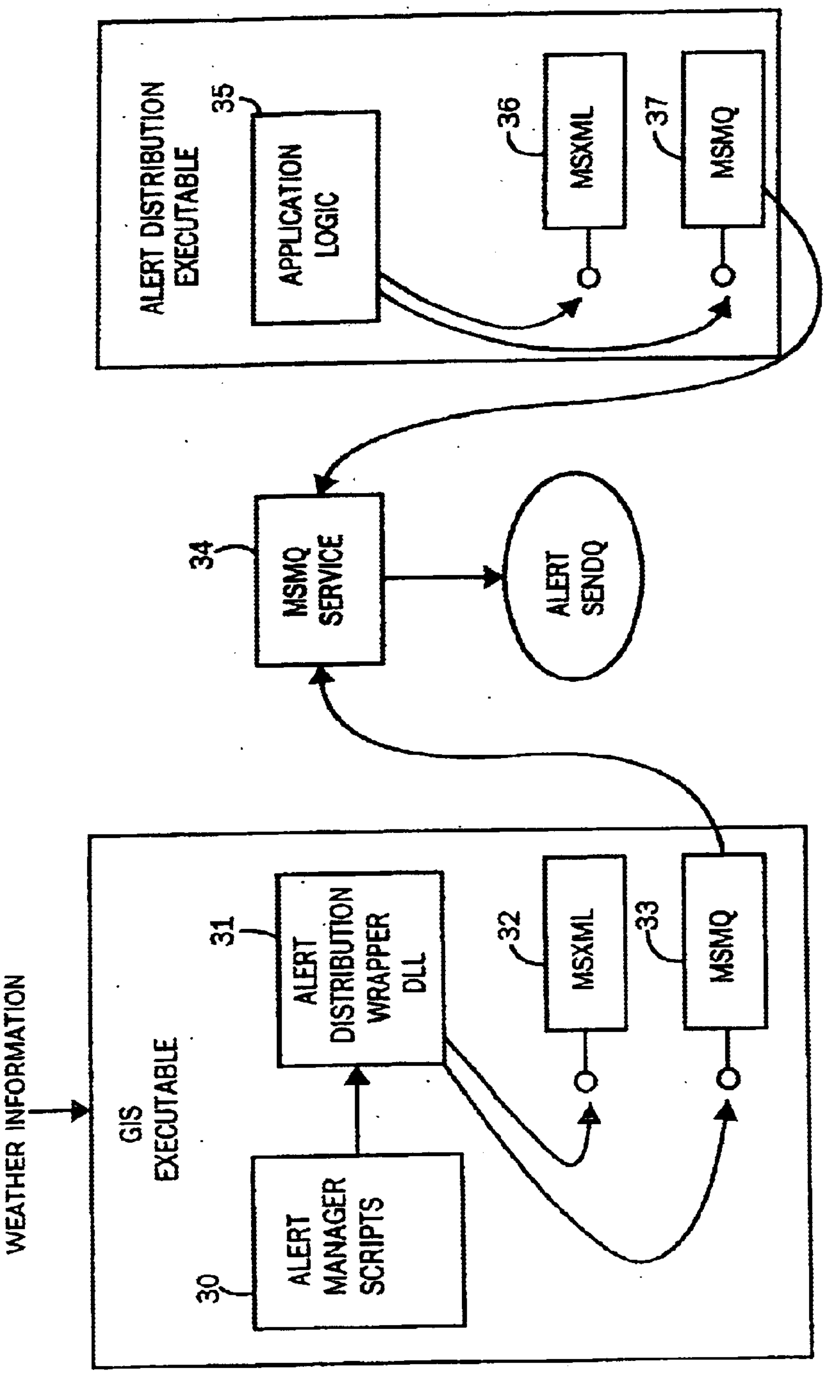
FIG. 4 is a flow chart showing the manner in which messages are generated based upon the weather data.

To provide a better understanding of the inter-relationship between the various software components described above, FIGS. 4–6 are provided. In FIG. 4, the Alert Manager 30 generates alert messages and routing information and forwards them to the Alert Distribution module 31. The Alert Distribution module then creates an XML style sheet 32 related to the message which is saved on file server 21 and an MSMQ message 33 which is capable of being forwarded by the MSMQ service 34 via router 23, DSU 24 to the DSU 25 and eventually to the file server 22. Similarly, the Alert Distribution module incorporates application logic 35 which can generate XML messages 36 and corresponding MSMQ messages 37. Again the XML messages 36 are saved on file server 21 (FIG. 3) and the MSMQ messages 37 are forwarded, via the MSMQ service 34 to the file server 22 at the business headquarters. This is more specifically shown in FIG. 5.

Figure 5:
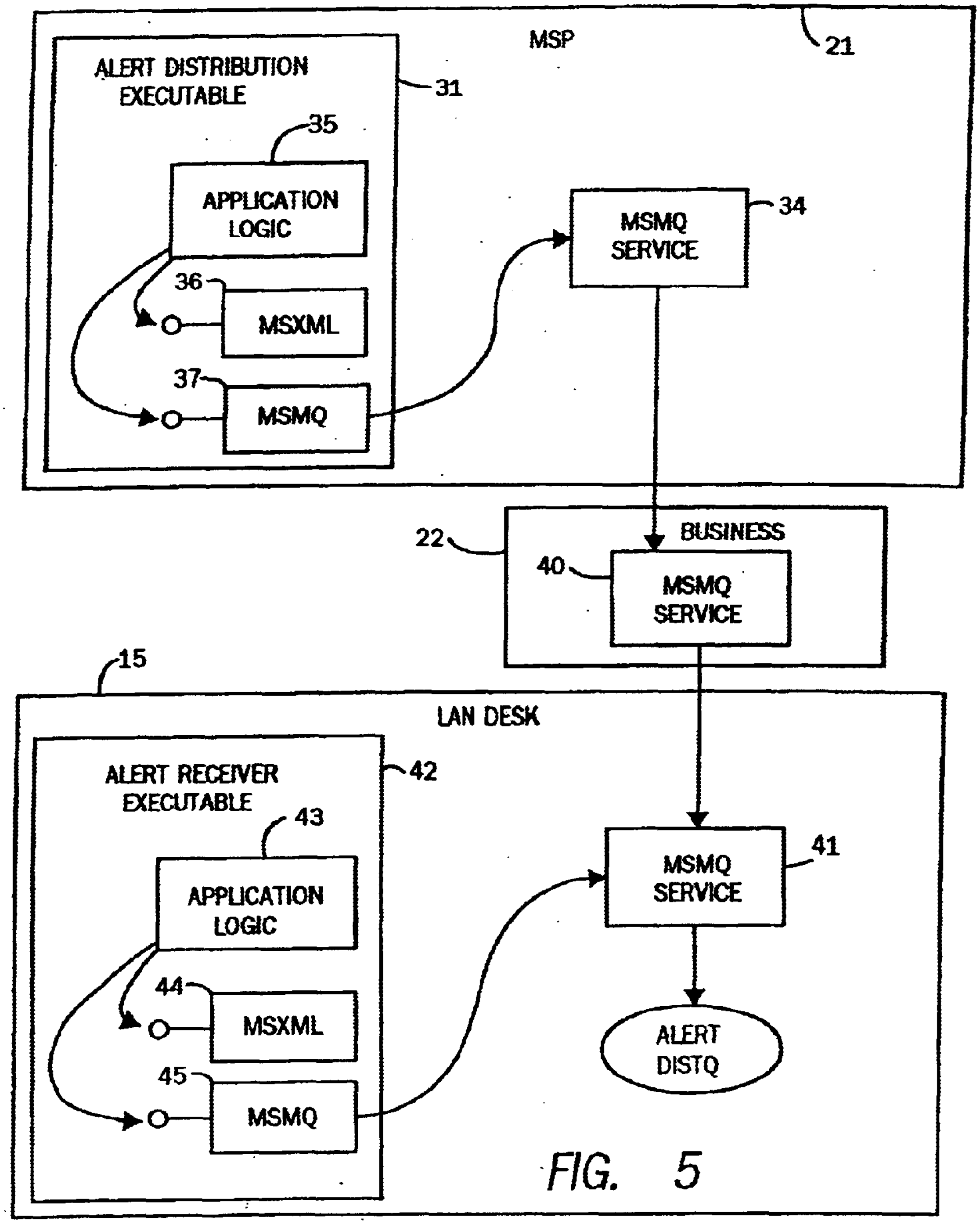
FIG. 5 is a flow chart showing the manner in which messages are distributed.

Referring to FIG. 5, the MSMQ messages 37 generated by the Alert Distribution module are forwarded to the file server 22 using the MSMQ software 34 on file server 21 and MSMQ software module 40 on file server 22. From there, the file server 22 delivers the messages to the appropriate workstation located on one of the desks. As shown in the example in FIG. 5, the message has been routed to desk 15 once the message is received by using the MSMQ 41 on workstation 15. The message is displayed on the workstation. The Alert Receiver software module 42 includes application logic 43 which requests, upon receipt of a message, an acknowledgment from the user. Assuming that the user acknowledges the message, the acknowledgment is saved as an XML style sheet 44 on desk and an MSMQ message 45 is sent back from the desk 15 through the file server 22 to the Alert Distribution software module on the file server 21. If no acknowledgment is received by the file server 21 within a predetermined period of time, the Alert Distribution software will escalate the message and send it to other personnel, such as a supervisor which works for the business.

As should be clear from the foregoing, FIGS. 4 and 5 describe the general manner in which messages are created and distributed. It is important to understand that the system is designed so that most messaging is two-way. In some implementations only one-way communication is required. The arrows in FIGS. 4 and 5 indicate the typical initiation of communication rather than the direction of primary flow.

Figure 6:
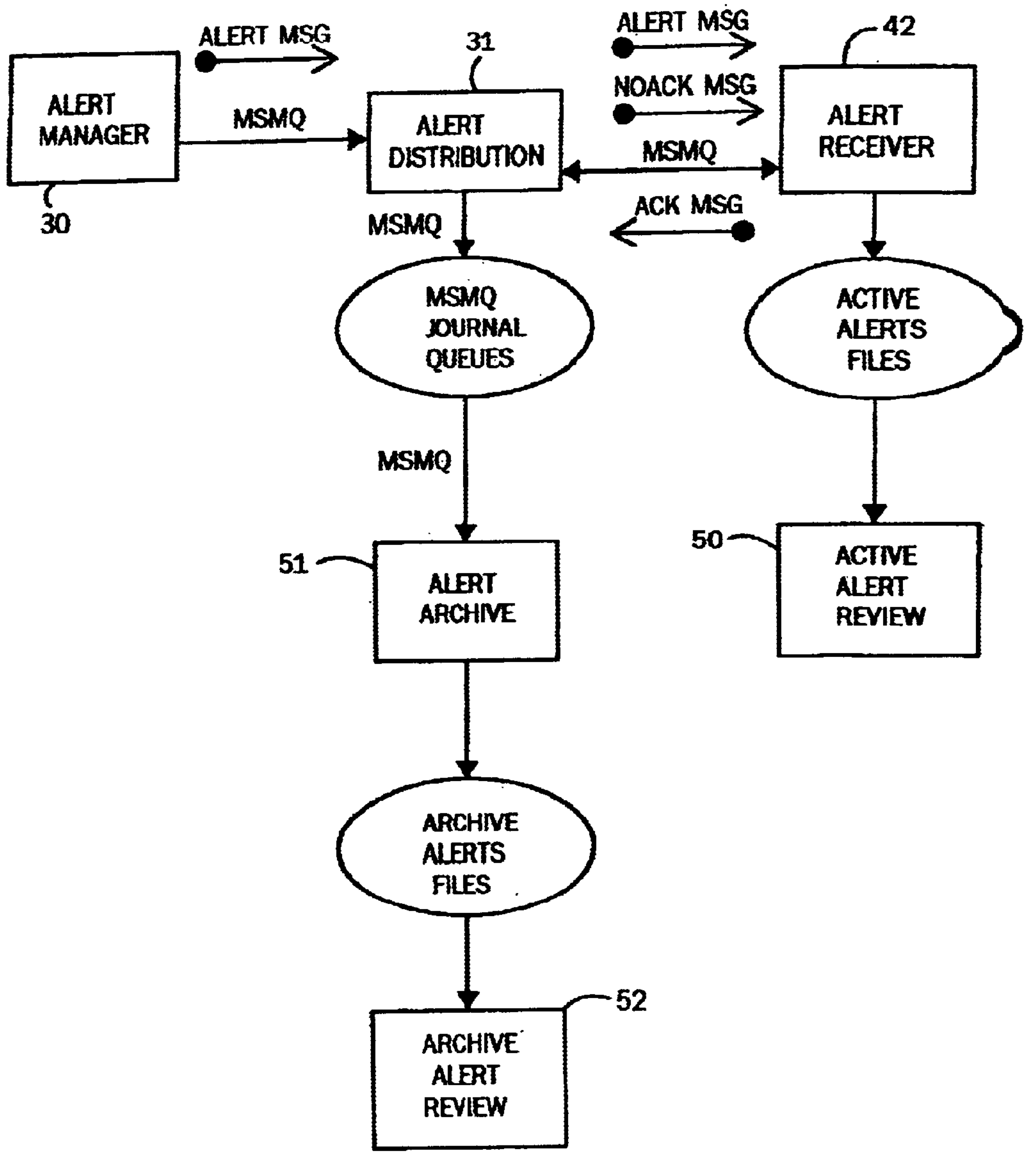
FIG. 6 is a flow chart showing the manner in which messages are processed.

FIG. 6 is included to show in greater detail some of the other aspects of the messaging system of the present invention. Toward the top of FIG. 6, one can see the flow of messages between the Alert Manager software 30, the Alert Distribution software 31 and the Alert Receiver software 42. FIG. 6 also shows the manner in which files are saved for future use. As indicated above, the workstations are not only equipped with the Alert Receiver software 42 but also an Active Alert Review module 50. Alert messages received by the Alert Receiver 42 are forwarded to the Active Alert Review module 50 upon the user sending an acknowledgment and closing the initial notification dialogs. Messages are stored on the workstation so long as they are currently active. This permits the user of the workstation to review active messages to study weather conditions even after the dialog has been closed.

Another important aspect of the present invention is also shown in FIG. 6. This is its ability to archive data and messages for review at a later point in time. Two modules loaded on the file server 21 make this possible. These modules are the Alert Archive module 51 and the Archive Alert Review module 52. As previously described, alert messages are stored in the MSMQ journals. Periodically, the messages stored in the MSMQ journals are archived to disk files and deleted from the journals. This function is performed by the Alert Archive 51. So that one can review these archived messages at a later point in time, the Archive Alert Review 50 is provided to allow the user to do so.

Now that a general overview of the system of the present invention has been provided, an example of how it can be implemented to protect the assets of a business will be discussed. In this example, the business is assumed to be a railroad, but as has been explained, it may be applied to many other businesses, as well.

Figure 8:
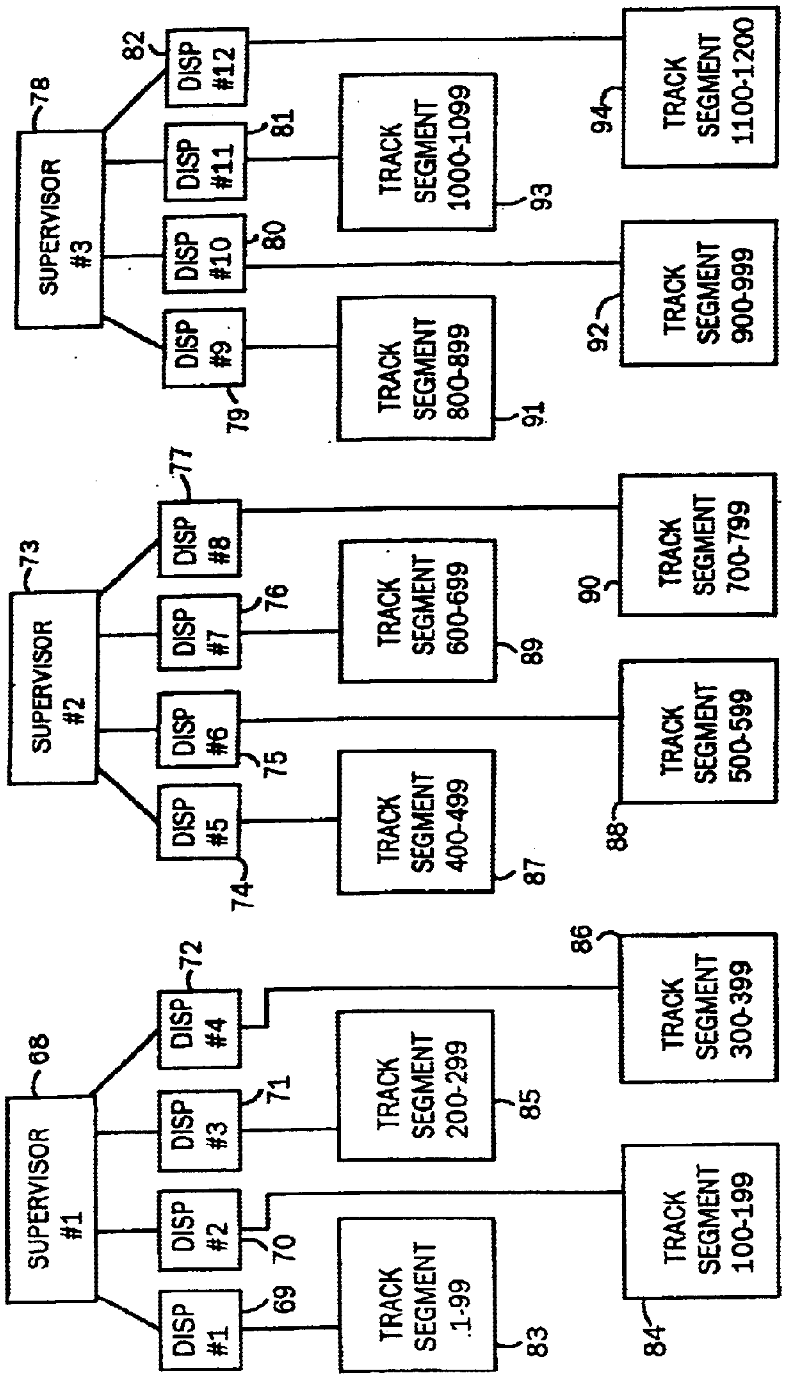
FIG. 8 is an organizational chart for the railroad of FIG. 7.

As shown in FIG. 8, the track operated by the railroad is divided into 1200 individual segments 83–94 referred to as "sections". Twelve dispatchers (69–72, 74–77 and 79–82) are divided into three groups and oversee and control the entire length of the railroad's track. A different set of track segments are managed by each dispatcher. A supervisor 68, 73, 78 is assigned to each group of dispatchers. The weather alert system of the present invention monitors weather conditions potentially affecting each of the 1200 railroad sections. When troublesome weather conditions are predicted for a particular section, the weather alert system issues an alert only to the dispatcher responsible for that particular segment of track. If the dispatcher fails to acknowledge the message during a predetermined period of time, a message is then sent to the dispatcher's supervisor.

Figure 7:
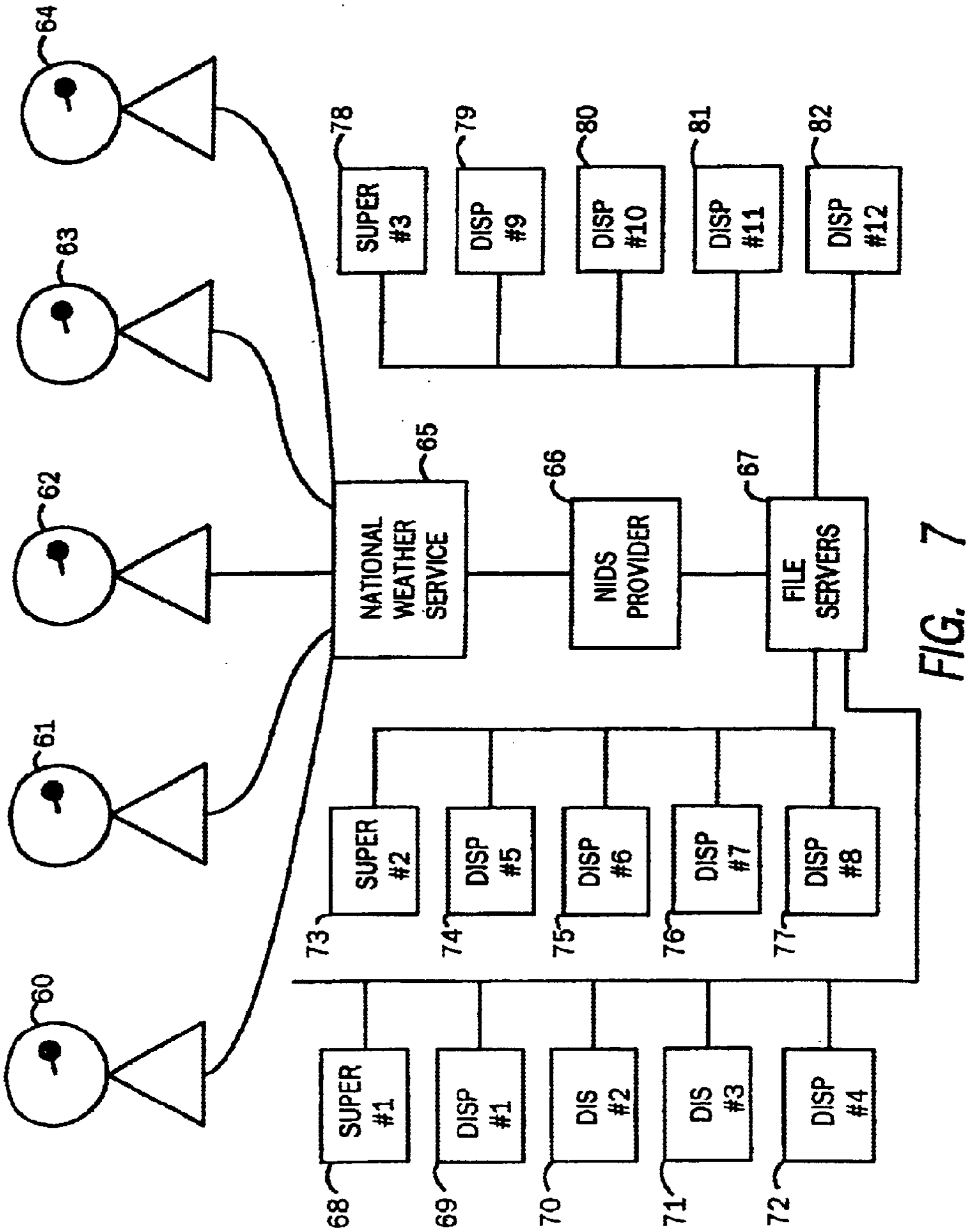
FIG. 7 is a block diagram showing the invention implemented for use by a railroad incorporating a file server having weather analysis, filtering and messaging processes.

FIG. 7 shows the hardware used to collect weather data and distribute weather alerts to the dispatchers and supervisors 68–82. As shown, weather stations 60–64 are positioned throughout the country. These weather stations collect weather data using Doppler weather radar and other location-based sensors. The NWS 65 collects raw data from these weather stations. The NWS 65 passes this raw data through to NIDS provider 66 who is then able to manipulate the raw data, enhance the raw data, and provide the raw data and enhancements to the file server 67 associated with a business.

The types of data utilized by the system of the present invention include the Combined Attribute Tables generated by the NWS NEXRAD radars at the weather stations 60–64, the temperature and wind forecast grids issued by the NWS, ambient weather conditions observed by the NWS, the current observations data made available by the NWS, and the weather warning and advisory bulletins issued by the NWS. Other sources of weather information can also be used.

A Combined Attribute Table is generated by each Doppler radar site for each radar scan during which a storm is detected. For each storm detected, the Combined Attribute Table includes a storm identification number, the current location of the storm relative to the radar's position (azimuth and range), the direction in which the storm is moving, and the speed at which the storm is moving. The table also contains data related to the nature and intensity of the storm. Specifically, the table indicates whether a tornadic vortex signature has been detected, whether there is a possibility of hail and if so an estimate of the maximum size of the hail, a reading of virtually integrated liquid, the height of the storm cell, and whether tornados have been detected. Combined Attribute Table data is automatically supplied by the computers of the National Weather Service 65 to the computers operated by the NIDS provider 66. The NIDS provider's computer filters the data and automatically forwards the desired data to the file server 67.

The file server 67 is the heart of the system of the present invention. Not only does it automatically ingest data from the NIDS provider 66, but it also processes the data and transports weather alerts to dispatcher and supervisor workstations 68–82. In the embodiment shown, the workstations 68–82 and file server 67 comprise a personal computer-based network. The file server 67 and each of workstations 68–82 have a unique address. While FIG. 7 suggests 15 users (12 dispatchers and 3 supervisors), the network can easily handle up to 100 separate users. Alternatively, the workstations could be other types of addressable devices capable of receiving messages from the file server 67 and issuing a signal back to the file server 67 acknowledging receipt of a message from the file server 67. Such devices include, but are not limited to, land-based telephones, cellular telephones, pagers, personal digital assistants, and other wireless communications devices.

In the embodiment described, the file server 67 uses a Windows NT operating system and Microsoft Message Queuing (MSMQ). The file server 67 also uses GIS software and a variety of software modules discussed below. Those skilled in the art will recognize that computers equipped with GIS software are capable of assembling, storing, manipulating and displaying geographically referenced information, i.e. data identified according to their geographic locations. GIS software also allows spatial analysis of weather data and non-weather geo-referenced landmarks, structures and features.

Using GIS technology, a first database is constructed. This database includes mapping information related to the location of each segment of track to be monitored by the system. The database also includes information identifying each segment or track section 83–94, the dispatcher (69–72, 74–77, 79–82) assigned to each section of track and supervisor (68, 73 or 78) responsible for each dispatcher and/or section. Addresses for the workstations used by the dispatchers and supervisors are also stored on the file server 67.

Another advantage of the GIS software is that weather information ingested by the file server can be quickly and easily mapped relative to the track operated by the railroad. The system knows the location of each weather station 60–64 having a reporting radar of the NEXRAD system and can easily convert the storm's polar coordinates (provided in the Combined Attribute Table) to Cartesian coordinates used by the GIS mapping system. Techniques for performing this conversion are well known in the art and have been used since early 1980's by the owner of the present invention. See U.S. Patent No. 4,347,618 to Kavouras et al dated Aug. 31, 1982 which is incorporated by reference.

The file server 67 automatically maps the position of detected storms and plots their speed and direction. Based upon the relative position of the storm and the various section of track, the file server 67 can determine which track sections might be affected by the storm and when the storm will impact that section. Not only is the file server 67 able to predict the nature of and time at which storms will impact sections of track, the system is also able to provide alerts for flooding and warnings related to temperature extremes based upon warnings, advisories and data received from the NWS and elsewhere.

Vast quantities of data are ingested by the file server 67. It is, therefore, advantageous to filter the data to ensure weather conditions are only reported to the dispatchers and supervisor 68–82 if the weather conditions meet certain pre-established thresholds. Such thresholds are all variable, but examples would typically include: (1) the presence of a tornado warning issued by the NWS; (2) the presence of a flash flood warning issued by the NWS; (3) observed temperatures less than 0° F. or greater than 100° F.; (4) forecast temperatures of less than 0° F. or greater than 100° F. within the next twelve hours; (5) observed wind speeds in excess of 40 miles per hour; (6) forecast wind speeds in excess of 40 miles per hour within the next twelve hours; and (7) the presence of a tornadic vortex signature identified by NEXRAD. If any of these thresholds (or any other predetermined threshold) is met relative to any segment of track monitored by the system, the present invention automatically generates and sends a message to the appropriate dispatcher(s). If none of the thresholds are met in the area of any track section, no message is sent.

To ensure delivery of the messages generated by the file server 67, the MSMQ software writes messages from the file server 67 to the appropriate dispatcher and supervisor workstations 68–82 which are located throughout the country. MSMQ is a store-and-forward service that is freely available to licensed Windows NT server users. The dispatcher and supervisor workstations 68–82 are individually addressable and configured as independent clients on the wide area network.

The GIS software is used as the geographic processing engine. When ESRI ArcView GIS software is used, avenue scripts process the weather data on the file server 67. Weather data are compared against the user-defined thresholds related to weather events. Whenever such thresholds are met or exceeded, the weather data is intersected with track segment location data so that significant weather events falling with a specified distance of a track segment can be identified. Messages are then generated as a result of this GIS spatial analysis.

To exploit the MSMQ capabilities as discussed above, various software components have been developed and are incorporated in the preferred embodiment of the present invention. The MSMQ software routes the messages from the file server 67 to the dispatchers and supervisors 68–82 located throughout the country.

The Alert Distribution software 31 accepts notification messages from the Alert Manager 30 and passes them along to MSMQ. The Alert Distribution software 31 also monitors acknowledgment of messages by dispatchers and, if no acknowledgment is received, generates a notification to the appropriate supervisor. All notifications, acknowledgments, and failures to acknowledge are logged using the journal feature of MSMQ.

The Alert Receiver software 42 resides on each dispatcher and supervisor workstation. When a notification message is received, the Alert Receiver software 42 initiates an on-screen dialog for the dispatcher's or supervisor's acknowledgment. Each notification includes an alert message. Notifications sent to supervisors include the original alert message and a non-acknowledgment notification message. This software also stores the notification data locally for further review by the dispatcher or supervisor.

The Active Alert Review software 50 also resides locally on each workstation. It allows the dispatcher or supervisor using the workstation to view currently active messages saved locally. The messages are saved as extensible markup language (XML).

The Alert Archive software 51 serves the function of periodically archiving the data in the MSMQ journals to disk files and then delete the archived data from the MSMQ journals. The disk files created by the Alert Archive software 51 permits the later review of historical alert message activity.

Now that the basic organizational structure of the system of the present invention has been presented, various applications of the invention will be discussed. The first to be discussed is application of the system to a railroad operation. The system's primary function is to alert a dispatcher in a timely fashion when predefined significant weather situation is detected which may affect one or more specific track segments. The system does not broadcast such messages to all dispatchers and supervisors. In the first instance, an alert message is only sent to the dispatcher(s) responsible for the track segment(s) to be affected by the weather. Only if the dispatcher fails to acknowledge the message is it sent to anyone else. In the event of a non-acknowledgment, the message is sent to the dispatcher's supervisor.

Figure 9:
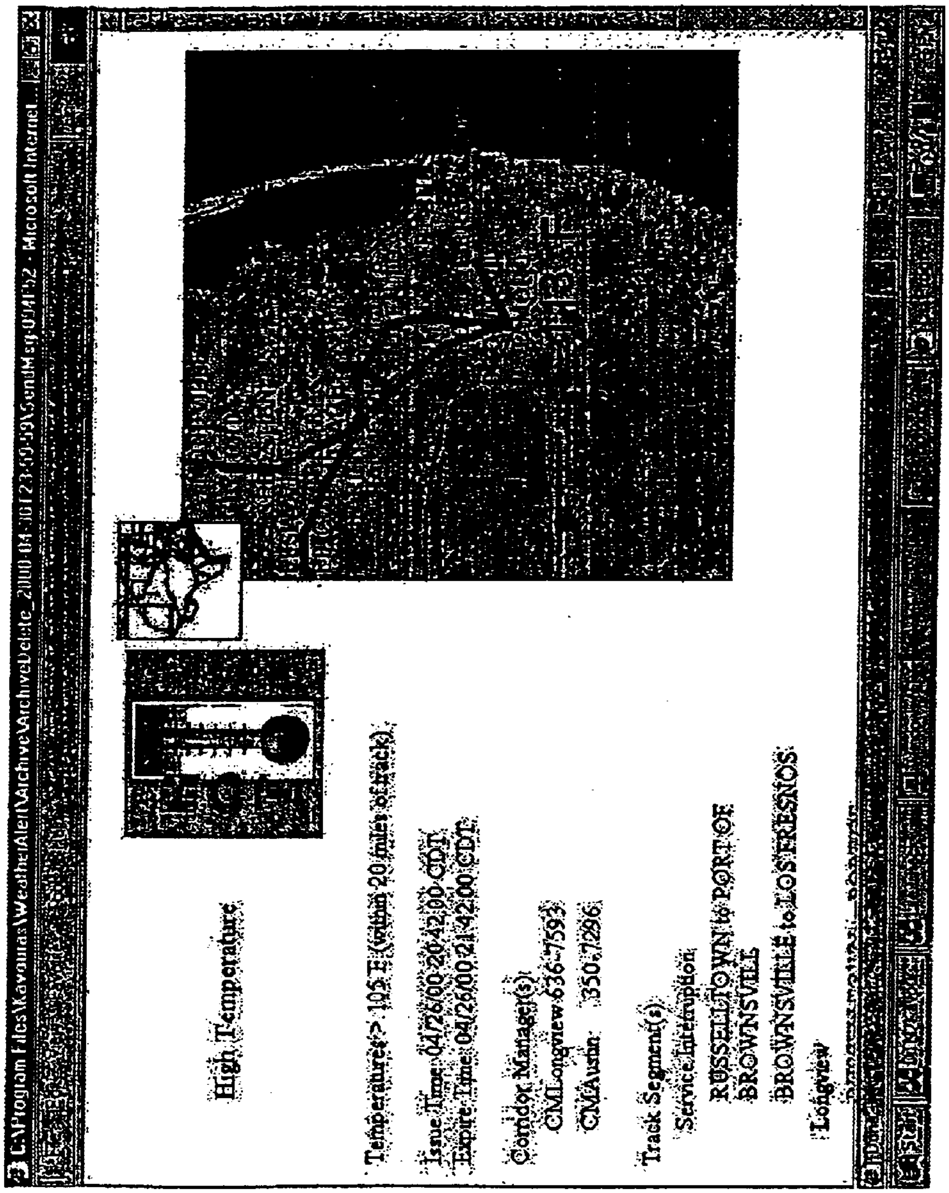
FIG. 9 is a sample message generated when high temperature conditions have been detected.
Figure 10:
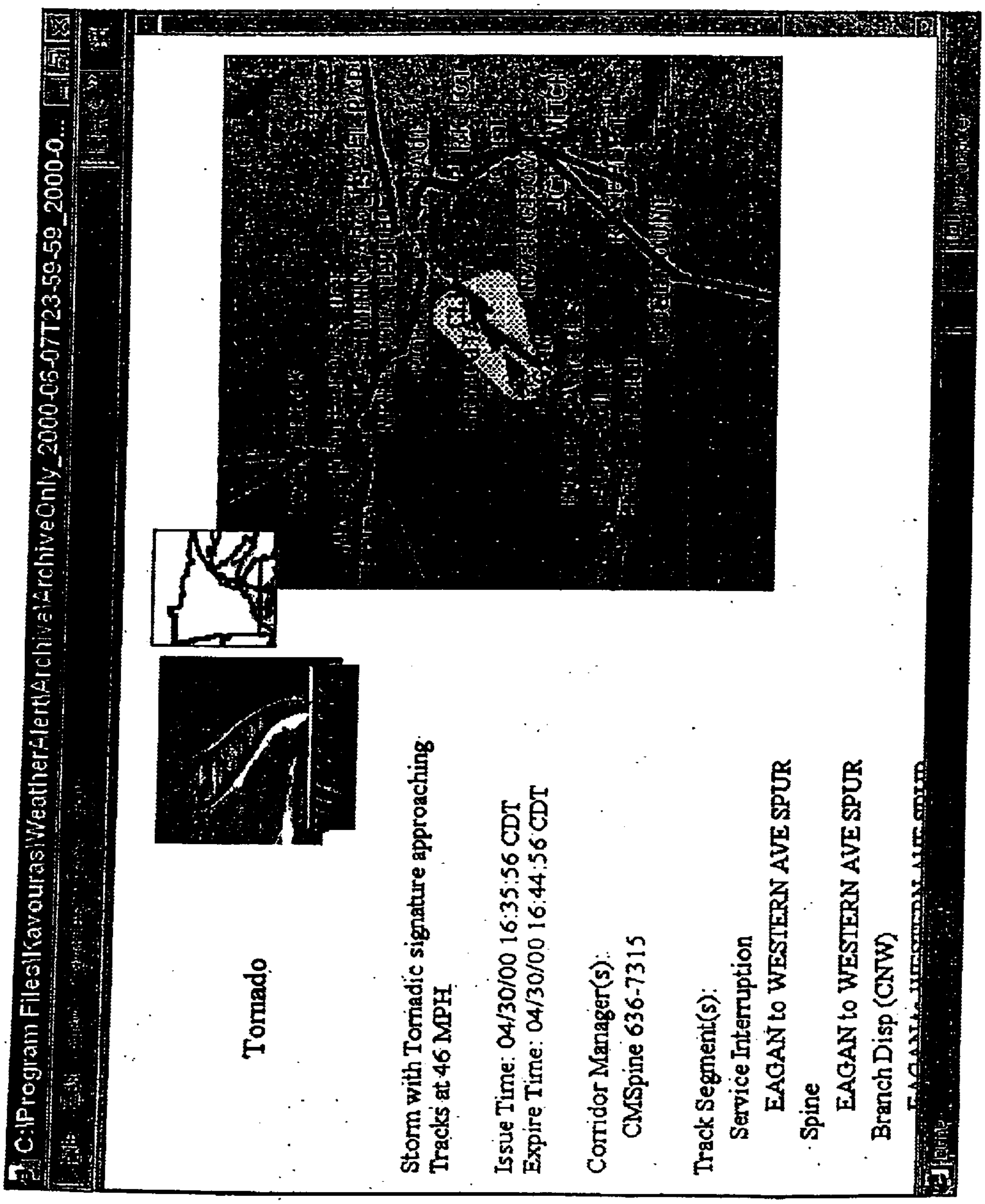
FIG. 10 is a sample message generated when a tornado has been detected.
Figure 11:
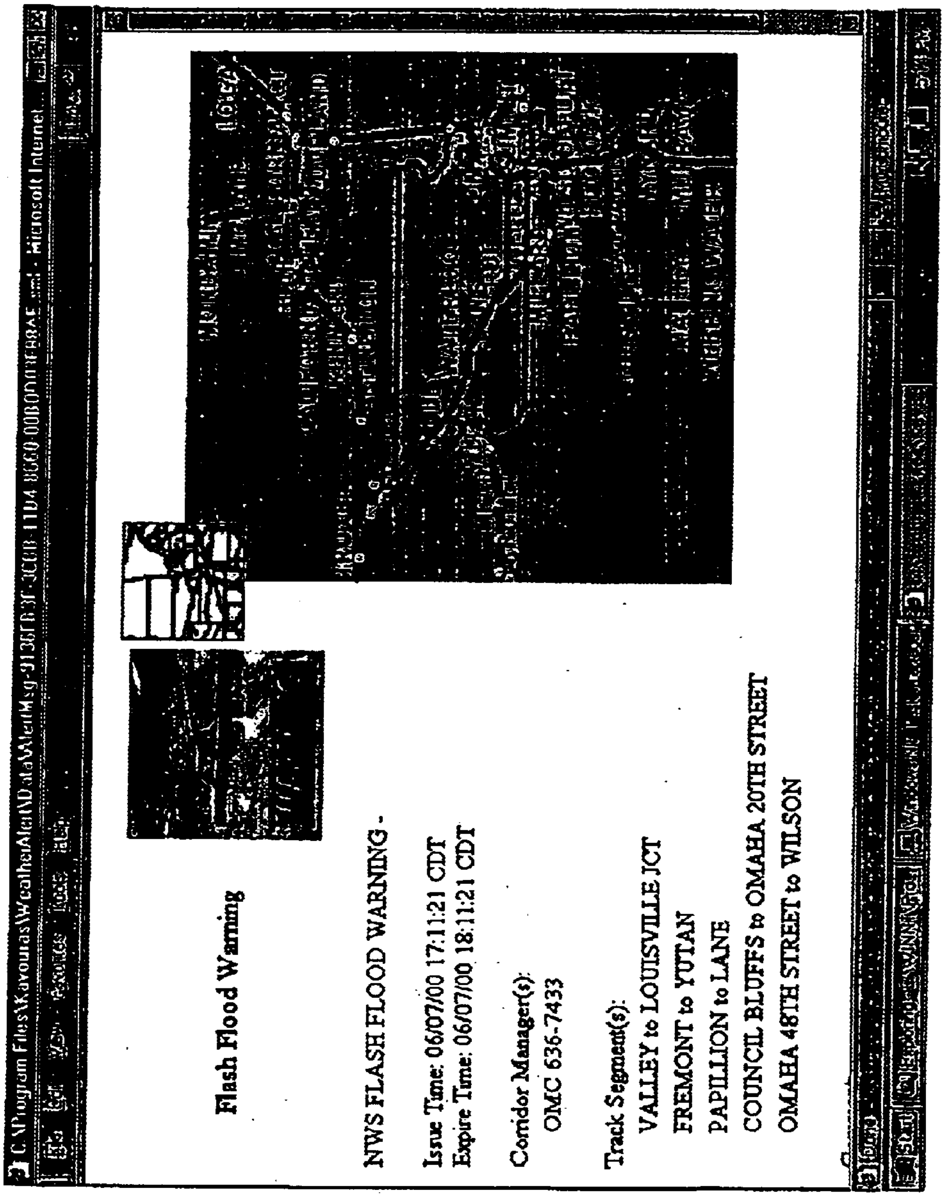
FIG. 11 is a sample of a message generated when a flash flood warning has been issued.
Figure 12:
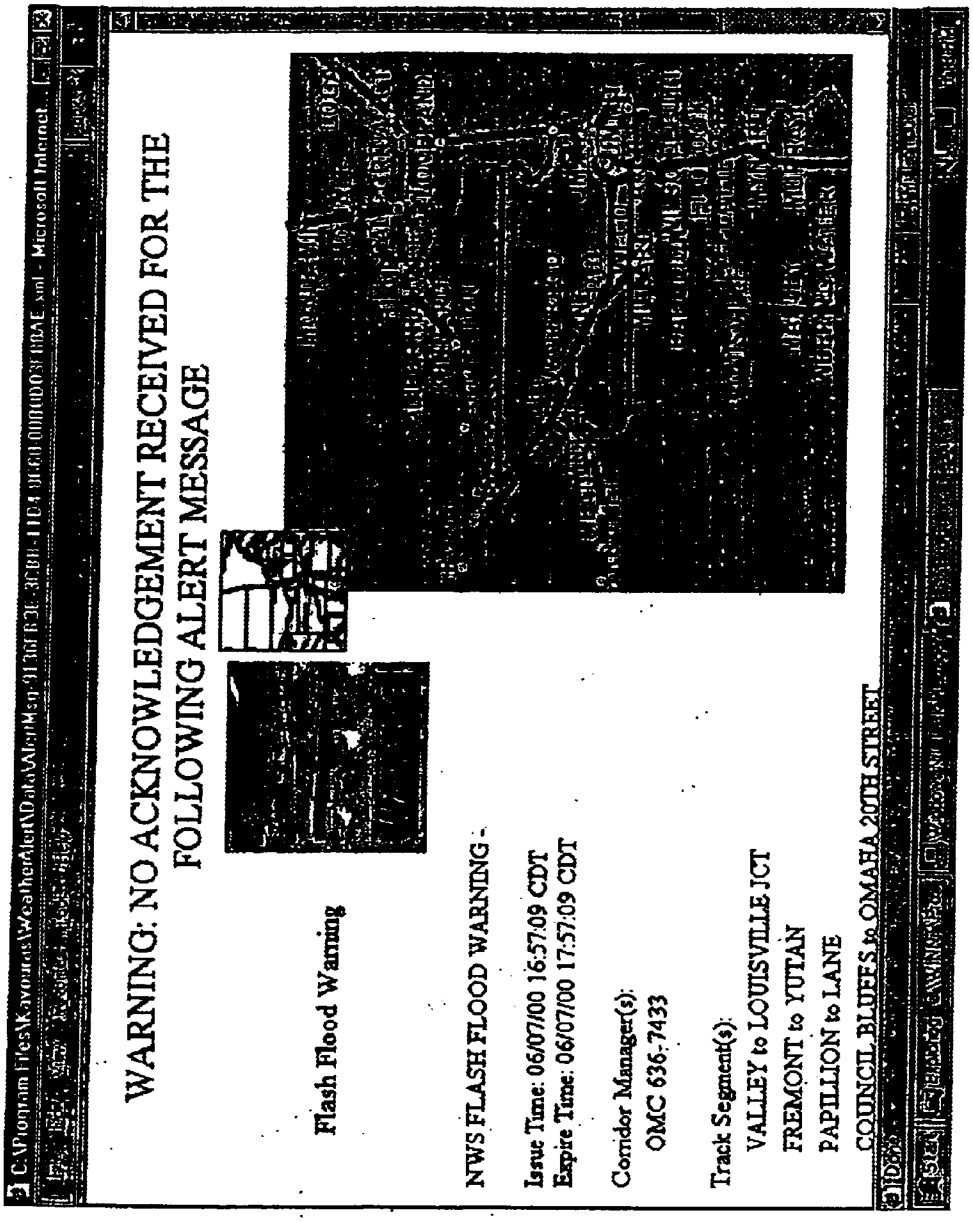
FIG. 12 is a sample of a message generated when no acknowledgment was received to the message shown in FIG. 11.

The messages sent are intended to be very specific. They will typically, but not necessarily, include a text component which highlights the nature of the alert. Examples of such messages are shown in FIGS. 9–11. In the example shown in FIG. 10, the text portion of the message includes an indicator of the reason for the alert (tornado approaching), the date and time the alert was issued (4/30/00 16:35:56 CDT), the time the alert will expire 4/30/00 16:44:56 CDT), and the identity of the responsible dispatcher (referred to as the corridor manager) and the segments of track to be affected. A recommended response to the alert can also be included in the message. The message shown in FIG. 10 also contains a graphic component which includes a map showing the section(s) of track likely to be affected, the position of the storm and the predicted storm path. FIG. 12 is an example of a message sent to a supervisor if no acknowledgment is received in response to a message sent to a dispatcher.

Of course, the specific nature of the messages generated will depend upon the types of devices serving as workstations and the nature of the assets being protected by the system. When cell phones are used, the message could be in the form of synthesized speech. When pagers are used, the message could be text-only. The system of the present invention is sophisticated enough that a variety of message formats and delivery mechanisms are available.

The system can also be used for other purposes as well to the benefit of the railroad. For example, daily or four-day forecasts can be distributed using the system. Different forecasts can be provided for different areas of services. For example, if the three supervisors 68, 73 and 78 shown in FIG. 8 supervise operations in different areas of the country, three separate forecasts could be generated. The forecast for the area covered by supervisor 68 would be sent only to supervisor 68 and the dispatchers 69–72 he or she supervises. Similarly, a second forecast could be sent exclusively to supervisor 73 and the associated dispatchers 74–76. A third forecast would be sent to supervisor 78 and the dispatchers 79–82 he or she supervises.

Another key aspect of the system is the ability to retain a log of weather conditions and messaging. This is particularly important in evaluating the efficacy of the system and the performance of dispatchers and supervisors in responding successfully to alerts. Also, in the event of a mishap, such data could help investigators determine the cause of the mishap.

The system of the present invention is highly automated. The NEXRAD system collects weather data automatically and disseminates it in near real time. The file server 67 automatically ingests the weather data and processes it automatically to determine if any track segments are to be affected by adverse conditions. If so, appropriate messages are automatically generated and transmitted to appropriate personnel so corrective action can be taken. The present system is highly effective in improving the safety of rail transportation and reducing mishaps related to weather phenomena.

The system of the present invention can be of substantial value to other businesses as well and particularly any business having operations that can be significantly affected by weather conditions. Most over-the-road trucking operations in this country are performed on or near interstate freeways and major highways. Just as GIS can be used to map segments of track operated by a railroad, GIS can also be used to map segments of freeways, highways and other roads.

For example, Interstate 35 runs all the way from Duluth, Minnesota on the shore of Lake Superior in the north to Laredo, Tex. on the Mexican border in the south. Adverse weather conditions will not impact the entire length of Interstate 35 at any point in time. Only a relatively small portion of this freeway will ever be impacted by high winds, tornadic activity, hail, sleet, snow, or any other condition that could impact trucking operations. The present invention can be used to divide the road into segments, determine which segments will be impacted by weather conditions meeting predetermined thresholds, and issue advisories to dispatchers so they can alert truckers who are or will be traveling on segments adversely affected by such weather conditions. In fact, the invention can be used to send such messages directly to the truck driver if the truck is equipped with (1) a device capable of receiving the messages and acknowledging their receipt; and (2) some mechanism is used to define the position of the truck (such as a global positioning system (GPS) receiver) and such position information is provided to the GIS software of the file server. Again, advisories are not sent to all dispatchers (or drivers) but only those with responsibility for communicating with drivers in an area likely to encounter adverse weather conditions.

The present invention can also be used to advise construction companies of approaching weather conditions that could threaten life or property. Construction companies can be involved in a single project at one location or multiple projects at dispersed locations. High winds, thunderstorms, tornados, hail and the like can all present a significant danger to construction workers. Such weather conditions can also result in significant damage to a construction project. Sufficient advanced warning can give supervisory personnel time to take steps necessary to protect and safeguard construction workers, equipment and materials. Again, not all construction sites are likely to be impacted in the same way or even at all by localized weather conditions. A storm cell can do significant damage in one area without doing any damage a half mile away. The GIS-based system of the present invention allows the construction sites operated by the company to be mapped and can be used to determine whether weather conditions could adversely impact work on a site-by-site basis. Advisories can then be sent to foremen or supervisors working at the site or sites likely to be impacted rather than to all foremen and supervisors.

Application of the present invention is not limited to the types of businesses discussed above. Other businesses can benefit from the present invention as well. Amusement parks, golf courses, ski resorts, marinas, race tracks, agricultural co-ops, school systems and the like could all apply the present invention to meet the weather forecasting needs of the particular enterprise to safeguard employees and customers, to protect equipment, and to improve the efficiency of operations.

The weather information notification system of the present invention can be implemented by a weather service provider as a subscription service for businesses. Individuals could also subscribe to the service. The subscriber has essentially no equipment costs because cell phones, pagers or personal computers connected to the Internet already owned by the subscriber can serve as a workstation of the system.

A party desiring to subscribe needs to provide the weather service provider with certain information. This includes the telephone number of any pager, cell phone, telephone or the IP address of any personal computer to serve as a workstation. This information can be programmed into the file server operated by the weather service provider and is used in addressing alert messages issued by the file server.

The subscriber can select what location(s) it wants to have monitored by the weather notification system. For each selected location, the subscriber can define what thresholds should be used to trigger the delivery of an alert message, to whom (i.e. to what telephone(s), cell phone(s), pager(s) or personal computer(s) the alert message should be sent in the first instance, the amount of time to be allowed for acknowledgment of receipt of the alert message, and to whom a second alert message should be sent in the event no acknowledgment of the first message is received by the file server within the time period selected by the subscriber. In addition, the subscriber can select the thresholds to be used by the system to automatically determine whether an alert message should be sent.

The subscriber can even select the source or sources of weather data to be used by the system. Such data would typically include Combined Attribute Table data and watches and warnings supplied by the NWS. In addition, the subscriber could select observational data reported from various weather reporting stations within the vicinity of a selected location to be monitored. Typically, the subscriber would define the location of the site to be monitored, define a "radius of influence" around the site to be monitored, and select from the various weather reporting stations within the "radius of influence". There is nothing to prevent the user from selecting weather reporting stations outside the "radius of influence". For example, the subscriber might select all weather reporting stations within the "radius of influence" and one or more Tier 1 observation sites (typically located at airports) even if they are not located within the radius of influence.

The use of GIS technology in this invention permits areas of coverage to be defined in any number of ways. Virtually any line point, radius, or other shaped area can be defined by the user and monitored by the system.

The system of the present invention is so flexible that the user can even define different thresholds for triggering the issuance of an alert message for the different weather reporting stations selected. For example, the system could be set to issue an alert message if wind speeds of 40 miles per hour were detected at one weather reporting station. For another, more distant weather reporting station, the threshold might be set at 50 miles per hour. Similarly, the subscriber can define the nature of the content of alert messages to be delivered when predetermined thresholds are met. A plurality of telephones, cellular phones, pagers and personal computers could all be sent messages when a predetermined threshold is met, the message sent to each being different depending upon the steps the subscriber wants the employee in possession of the telephone, cell phone, pager or personal computer to take based upon the weather alert. Likewise, the system can be designed to issue different messages as the predicted weather conditions change. The system would typically only issue one alert for a hail storm. However, if tornadic activity associated with the storm is later detected, a second alert can be issued.

The foregoing description is intended to provide a description which meets all of the disclosure requirements of the patent laws. It is not intended to be limiting. Deviations from what has been described are clearly intended to fall within the scope of the invention which is defined by the following claims:

What is claimed:

1. A method for automatically generating weather alerts based upon the location of assets to be monitored comprising:

a. creating a network comprising a file server and a plurality of addressable workstations, each of said workstations individually associated with at least one asset to be monitored, said workstations each under the control of a separate decision maker;

b. constructing a first database accessible by said file server, said first database including (i) information identifying the assets to be monitored, (ii) mapping information related to the locations of said assets to be monitored, (iii) for each asset to be monitored, the address of each workstation associated therewith, and (iv) predetermined weather parameters and associated thresholds for said assets;

c. automatically ingesting multiple types of weather data into a second database accessible by said file server;

d. automatically using software to (i) process said mapping information related to the location of assets to be monitored and processing said data in said second database to determine what weather conditions will exist at the locations of assets to be monitored, and (ii) compare, for said locations of assets to be monitored, said weather conditions with said predetermined weather thresholds to determine whether assets to be monitored are located where weather conditions will exceed said predetermined weather thresholds; and e. automatically transmitting an alert message to a workstation associated with an asset to be monitored if weather conditions will exceed said predetermined weather thresholds.

2. The method of claim 1 wherein different sets of predetermined weather thresholds are stored in said first database for different assets to be monitored and an alert message is only transmitted to a workstation associated with an asset to be monitored if weather conditions at the location of the asset will exceed the set of predetermined weather thresholds for that asset.

3. The method of claim 1 wherein said workstations are remote from the locations with which they are associated.

4. The method of claim 1 wherein at least one of said workstations is a personal computer.

5. The method of claim 1 wherein at least one of said workstations is a telephone.

6. The method of claim 1 wherein at least one of said workstations is a wireless two-way communications device.

7. The method of claim 1 further including the step of archiving said messages.

8. The method of claim 1 wherein at least one of the workstations is portable, co-located with an asset with which it is associated and sends new location information to the file server for the asset with which it is co-located, said new location information used to update the information identifying the location of assets to be monitored included in said first database.

9. A weather-enabled decision support apparatus for automatically generating asset-based weather alerts comprising:

a. a network comprising a file server and a plurality of addressable workstations, each of said workstations individually associated with at least one asset to be monitored, said workstations each under the control of a separate decision maker;

b. a first database accessible by said file server, said first database including (i) information identifying the assets to be monitored, (ii) mapping information related to the locations of said assets to be monitored, (iii) for each asset to be monitored, the address of each workstation associated therewith, and (iv) predetermined weather parameters and associated thresholds for said assets;

c. a second database accessible by said file server including multiple types of weather data automatically ingested into said second database, d. software for automatically (i) processing said mapping information related to said locations of assets to be monitored and process said data in said second database to determine what weather conditions will exist at said locations of assets to be monitored, (ii) comparing, for said locations of assets to be monitored, said weather conditions to said predetermined thresholds to determine whether weather conditions at any of said locations of said assets to be monitored will exceed said thresholds, and (iii) generating and transmitting weather alert messages to workstations associated with assets to be monitored where weather conditions will exceed said predetermined thresholds.

10. The apparatus of claim 9 wherein different sets of predetermined weather thresholds are stored in said first database for different assets and an alert message is only transmitted to a workstation associated with an asset if weather conditions at that location of the asset will exceed the set of predetermined weather thresholds for that asset.

11. The apparatus of claim 9 wherein said workstations are remote from the locations of said assets with which they are associated.

12. The apparatus of claim 9 wherein at least one of said workstations is a personal computer.

13. The apparatus of claim 9 wherein at least one of said workstations is a telephone.

14. The apparatus of claim 9 wherein at least one of said workstations is a wireless two-way communications device.

15. The apparatus of claim 9 further including storage in which said messages are archived.

16. The apparatus of claim 9 wherein at least one of the workstations is portable, co-located with an asset with which it is associated and sends new location information to the file server for the asset with which it is co-located, said new location information used to update the information identifying the locations of assets to be monitored included in said first database.

17. The apparatus of claim 9 wherein said predetermined weather parameters and associated thresholds are selectable.

18. The apparatus of claim 9 wherein said alert messages can be based either upon current or predicted future weather conditions.

19. The apparatus of claim 9 wherein at least one of said workstations includes a display and is capable of displaying in graphical form a set of said assets and indicating which of said assets in said set of assets are the subject of an alert.

20. A weather-enabled decision support apparatus for automatically generating asset based weather alerts comprising:

a file server and a plurality of addressable workstations, each of said workstations under the control of a separate decision maker and selectively associated with at least one asset to be monitored and capable of communicating with the fileserver and forming a network therewith, said file server capable of:

a. storing geographic information related to locations of assets to be monitored;

b. for individual assets to be monitored, storing the address of at least one workstation associated with the asset;

c. storing a predetermined set of weather related parameters and associated thresholds for said assets;

d. and being programmed to (i) automatically ingest multiple types of weather data from at least one source; (ii) use said weather data and said geographic information to map weather conditions relative to the individual locations of assets to be monitored: (iii) use the weather data to determine if individual locations of assets to be monitored exist where weather conditions will exceed at least one of said thresholds; and (iv) automatically generate a first alert message if there is an intersection between a location of an asset to be monitored and a geographic area where weather conditions will exceed at least one of said thresholds and automatically transmit said first alert message over said network to the address of the at least one workstation associated with the asset located where said intersection exists.

21. The apparatus of claim 20 wherein different sets of predetermined weather thresholds are stored by said file server for different assets and an alert message is only transmitted to a workstation associated with an asset if weather conditions at the location of said asset will exceed the set of predetermined weather thresholds for that asset.

22. The apparatus of claim 20 wherein said workstations are remote from the location of the assets with which they are associated.

23. The apparatus of claim 20 wherein at least one of said workstations is a personal computer.

24. The apparatus of claim 20 wherein at least one of said workstations is a telephone.

25. The apparatus of claim 20 wherein at least one of said workstations is a wireless two-way communications device.

26. The apparatus of claim 20 further including storage in which said messages are archived.

27. The apparatus of claim 20 wherein at least one of the workstations is portable, co-located with an asset to be numbered and sends new location information for said asset to the file server, said new location information used to update said information identifying the locations of assets to be monitored stored by the file server.

28. The apparatus of claim 20 wherein said predetermined weather parameters and associated thresholds are selectable.

29. The apparatus of claim 20 wherein said alert messages can be based either upon current or predicted future weather conditions.

30. The apparatus of claim 20 wherein at least one of said workstations includes a display and is capable of displaying in graphical form a set of said assets and indicating which of said assets in said set of assets are the subject of an alert.

31. A weather-enabled decision support apparatus for automatically generating asset-based weather alerts comprising:

a file server and a plurality of addressable workstations, each of said workstations under the control of a separate decision maker and selectively associated with one or more assets to be monitored and capable of communicating with the file server and forming a network therewith, said file server capable of:

a. storing geographic information related to assets to be monitored;

b. for individual assets to be monitored, storing the address of at least one workstation associated with the location;

c. storing at least one predetermined set of weather related parameters and associated thresholds for said assets;

d. and being programmed to (i) automatically ingest multiple types of weather data from at least one source, (ii) automatically compare said weather data to said thresholds, (iii) automatically compare locations of individual assets to be monitored and geographic areas where weather conditions will exceed at least one of said thresholds, (iv) automatically using said comparison to identify which individual assets to be monitored are located where weather conditions exceeding at least one of said thresholds will exist, (v) automatically generate a first alert message if there is an intersection between the location of an asset to be monitored and a geographic area where weather conditions will exceed at least one of said thresholds; and (vi) automatically transmit said first alert message over said network to the address of the at least one workstation associated with the asset located where said intersection exists.

32. The apparatus of claim 31 wherein said file server is further programmed to wait a predetermined period of time after transmitting said first alert message for an acknowledgement of receipt of said alert message and, if no acknowledgement is received during said predetermined period, generate a second message to a second of said addressable workstations.

33. The apparatus of claim 31 wherein said at least one workstation includes a display and said first alert message sent to said at least one workstation contains a map such that a representation of at least a portion of said map is displayed on the display of said at least one workstation.

34. The apparatus of claim 31 wherein said predetermined weather parameters and associated thresholds are selectable.

35. The apparatus of claim 31 wherein said alert messages can be based either upon current or predicted future weather conditions.

36. The apparatus of claim 31 wherein at least one of said workstations includes a display and is capable of displaying in graphical form a set of said assets and indicating which of said assets in said set of assets are the subject of an alert.

37. A weather-enabled decisions support apparatus for automatically generating asset based weather alerts comprising:

a file server and a plurality of addressable workstations, each of said workstations under the control of a separate decision maker and selectively associated with one or more assets to be monitored and capable of communicating with the file server and forming a network therewith, said file server capable of:

a. storing, for each asset to be monitored, geographic information related to location of said asset and the address of at least one workstation selectively associated with said asset;

b. storing at least one predetermined set of weather related parameters and associated thresholds for said assets;

c. and being programmed to (i) automatically ingest multiple types of weather data from at least one source, (ii) automatically compare said weather data to said thresholds, (iii) automatically determine whether any assets to be monitored are located in geographic areas where weather conditions will exceed at least one of said thresholds, (iv) automatically generate a first alert message if a geographic area where weather conditions will exceed at least one of said thresholds; and (vi) automatically transmit said first alert message over said network to the address of said at least one workstation selectively associated with said asset.

38. The apparatus of claim 34 wherein at least one of said workstations is a personal computer.

39. The apparatus of claim 34 wherein at least one of said workstations is a telephone.

40. The apparatus of claim 34 wherein at least one of said workstations is a wireless two-way communications device.

41. The apparatus of claim 34 further including storage in which said messages can be archived.

42. The apparatus of claim 34 wherein at least one of the workstations is portable co-located with an asset and sends new location information to the file server, said new location information used to update the information stored by the file server identifying the locations of assets to be monitored.

43. The apparatus of claim 34 wherein said at least one workstation includes a display and said first alert message sent to said at least one workstation contains a map such that a representation of at least a portion of said map is displayed on said at least one workstation.

44. A weather-enabled decision support apparatus for automatically generating asset based weather alerts to people having responsibility for said assets comprising:

a. a plurality of addressable workstations, each of said workstations assigned to persons having responsibility for at least one asset to be monitored;

b. a file server capable of:

(i) storing a plurality of sets of predetermined weather related parameters and associated thresholds for said assets;

(ii) storing, for each asset to be monitored, geographic information related to the location of said asset, the identity of the set of predetermined weather related thresholds to be used for said asset, and the address of a workstation assigned to a person having responsibility for said asset;

(iii) automatically ingesting weather data;

(iv) determining the weather conditions for the location of each asset to be monitored;

(v) comparing, for each asset to be monitored, weather conditions for the location of said asset with the set of predetermined weather related thresholds to be used for said asset to determine whether the weather conditions at the location of said asset will exceed any of the thresholds in the set of predetermined weather related thresholds to be use for said asset;

(vi) automatically generating a first alert message and automatically transmitting said message to the address of a workstation assigned to a person having responsibility for an asset to be monitored if weather conditions will exceed at least one of the thresholds of the set of thresholds associate with that asset at the location of said asset.

45. The apparatus of claim 41 wherein at least one of said workstations is a personal computer.

46. The apparatus of claim 41 wherein at least one of said workstations is a telephone.

47. The apparatus of claim 41 wherein at least one of said workstations is a wireless two-way communications device.

48. The apparatus of claim 41 further including storage in which said messages are archived.

49. The apparatus of claim 41 wherein at least one of the workstations is portable, moves with the asset with which it is associate and sends new location information to the file server, said new location information used to update the information stored on the file server identifying the locations of assets to be monitored.

50. The apparatus of claim 41 wherein said at least one workstation includes a display and said first alert message sent to said at least one workstation contains a map such that a representation of a map showing weather data and the location of at least one asset to be monitored is displayed on said at least one workstation.

51. The apparatus of claim 41 wherein said predetermined weather parameters and associated thresholds are selectable.

52. The apparatus of claim 41 wherein said alert messages can be based either upon current or predicted future weather conditions.

53. The apparatus of claim 41 wherein at least one of said workstations includes a display and is capable of displaying in graphical form a set of said assets and indicating which of said assets in said set of assets are the subject of an alert.

* * * * *